United States Patent
Wells

(12) United States Patent (10) Patent No.: US 8,589,997 B2
Wells (45) Date of Patent: Nov. 19, 2013

(54) CATV ENTRY ADAPTER AND METHOD FOR REMOTELY ENABLING AND DISABLING CATV SERVICE AT A SUBSCRIBER'S PREMISES

(75) Inventor: Chad Wells, Highlands Ranch, CO (US)

(73) Assignee: PPC Broadband, Inc., East Syracuse, NY (US)

( * ) Notice: Subject to any disclaimer, the term of this patent is extended or adjusted under 35 U.S.C. 154(b) by 46 days.

(21) Appl. No.: 13/294,916

(22) Filed: Nov. 11, 2011

(65) Prior Publication Data
US 2013/0125193 A1 May 16, 2013

(51) Int. Cl.
H04N 7/173 (2011.01)
H04N 7/16 (2011.01)

(52) U.S. Cl.
USPC .......................................... 725/127; 725/149

(58) Field of Classification Search
None
See application file for complete search history.

(56) References Cited

U.S. PATENT DOCUMENTS

| 5,604,528 | A  | * | 2/1997 | Edwards et al. | 725/25  |
|-----------|----|---|--------|----------------|---------|
| 7,530,091 | B2 | * | 5/2009 | Vaughan        | 725/106 |
| 7,783,195 | B2 | * | 8/2010 | Riggsby        | 398/67  |
| 8,179,814 | B2 | * | 5/2012 | Shafer et al.  | 370/252 |
| 2010/0125877 | A1 | * | 5/2010 | Wells et al. | 725/78 |
| 2010/0162340 | A1 | * | 6/2010 | Riggsby      | 725/127 |

* cited by examiner

Primary Examiner — Chris Parry
(74) Attorney, Agent, or Firm — Hiscock & Barclay LLP

(57) ABSTRACT

A community access or cable television (CATV) entry adapter interfaces a CATV network to subscriber devices at a subscriber premises. The CATV entry adapter is remotely disabled or enabled through the CATV network to prevent or allow downstream CATV signals from reaching subscriber devices connected to the adapter. The CATV entry adapter is also adapted to function as a hub in a MoCA network independently of whether the CATV entry adapter is disabled or enabled.

25 Claims, 8 Drawing Sheets

CATV ENTRY ADAPTER AND METHOD FOR REMOTELY ENABLING AND DISABLING CATV SERVICE AT A SUBSCRIBER'S PREMISES

CROSS REFERENCE TO RELATED APPLICATION

This application incorporates herein by this reference, the subject matter of prior U.S. patent application Ser. No. 12/175,366, filed Jul. 17, 2008, for PASSIVE ACTIVE TERMINAL ADAPTER AND METHOD HAVING AUTOMATIC RETURN LOSS CONTROL; Ser. No. 12/250,229, filed Oct. 13, 2008, for INGRESS NOISE INHIBITING NETWORK INTERFACE DEVICE AND METHOD FOR CABLE TELEVISION NETWORKS, Ser. No. 12/255,008, filed Oct. 21, 2008, for MULTI-PORT ENTRY ADAPTER, HUB AND METHOD FOR INTERFACING A CATV NETWORK AND A MOCA NETWORK, Ser. No. 12/563,719, filed Sep. 21, 2009, for PASSIVE MULTI-PORT ENTRY ADAPTER AND METHOD FOR PRESERVING DOWNSTREAM CATV SIGNAL STRENGTH WITHIN IN-HOME NETWORK, Ser. No. 12/691,149, filed Jan. 21, 2010, for CATV ENTRY ADAPTER AND METHOD FOR PREVENTING INTERFERENCE WITH EMTA EQUIPMENT FROM MOCA SIGNALS, all of which are assigned to the assignee of the present invention.

FIELD OF THE INVENTION

This invention relates to community access or cable television (CATV), and more particularly, to a new and improved CATV entry adapter which responds to command signals from a CATV service provider to enable or disable a CATV entry adapter at a subscriber's premises and to selectively permit communication between the CATV network and certain subscriber devices connected to the entry adapter in the subscriber premises.

BACKGROUND OF THE INVENTION

CATV networks use an infrastructure of interconnected coaxial cables, signal splitters and combiners, repeating amplifiers, filters, trunk lines, cable taps, drop lines and other signal-conducting devices to supply and distribute high frequency "downstream" signals from a main signal distribution facility, known as a "headend," to the premises (homes and offices) of subscribers to the CATV services. The downstream signals enter the subscriber premises and cause the operation of certain subscriber devices, such as television sets, telephone sets and computers. In addition, most CATV networks also transmit "upstream" signals from the subscriber devices back through the CATV network infrastructure to a headend of the CATV network. For example, the subscriber uses a set top box to select programs for display on the television set. As another example, two-way communication is essential when using a personal computer connected through the CATV infrastructure to the public Internet. As a further example, voice over Internet protocol (VoIP) telephone sets use the CATV infrastructure and the public Internet as the communication medium for transmitting two-way telephone conversations.

The downstream signals are delivered from the CATV network infrastructure through a CATV entry adapter to the subscriber premises, and upstream signals originating at the subscriber premises are delivered through the CATV entry adapter to the CATV network infrastructure. The CATV entry adapter is also commonly referred to as an entry device, terminal adapter or a drop amplifier. The CATV entry adapter is a multi-port device which connects at an entry port to the CATV drop cable from the CATV network infrastructure. The multiplicity of other signal distribution ports of the entry adapter are connected to in-home or in-premises coaxial cables which extend throughout the subscriber premises to separate cable outlets. Each cable outlet is connected to, or is available to be connected to, a subscriber device. Typically, most homes have coaxial cables extending to cable outlets in almost every room, because different types of subscriber devices may be used in different rooms. For example, television sets, computers and telephone sets are commonly used in many different rooms of a home or office. The multiple signal distribution ports of the entry adapter deliver the downstream signals from the entry port to each cable outlet and conduct the upstream signals from the distribution ports to the entry port and the drop cable of the CATV infrastructure.

Subscribers pay for CATV services, which are delivered by permitting the subscriber to receive CATV signals supplied by the CATV service provider over the CATV network infrastructure to the subscriber premises. To deliver CATV signals only to those CATV subscribers which have paid for the CATV service, the CATV service provider dispatches a technician to the subscriber premises to connect the drop coaxial cable from the cable tap of the CATV network infrastructure to a CATV entry adapter which is located at the subscriber premises. In this manner, downstream CATV signals are delivered from the CATV network infrastructure to the subscriber, and upstream signals from subscriber devices in the subscriber premises are delivered to the CATV network infrastructure and the CATV service provider.

So long as the subscriber pays for the CATV service, the physical connection between the entry adapter at the subscriber premises and the CATV network infrastructure external to the subscriber is maintained. Should the subscriber fail to pay for the CATV service, the CATV service provider sends a technician to the subscriber premises where the drop cable from the CATV network infrastructure cable tap is disconnected from the entry adapter. Once disconnected in this manner, the subscriber no longer receives CATV signals from the CATV network infrastructure.

Dispatching CATV technicians to enable and disable CATV service at each subscriber premises involves a significant cost to the CATV service provider. For example, each dispatch of a service technician, sometimes referred to as a "truck roll," in a major metropolitan area or a remote rural area may cost as much as $125. Since the typical monthly subscription fee for CATV services is less than $125, the service provider loses a significant amount of income due to the necessity for truck rolls to control the connection and disconnection of the entry adapters at each subscriber premises to and from the CATV network infrastructure. In addition, in those situations where the subscriber must provide entry for the technician to access the CATV entry adapter at the subscriber premises, the costs of truck rolls can be substantially increased due to failed attempts to coordinate schedules and meetings between the subscriber and the technician. A truck roll which is executed to a subscriber premises when the subscriber is not present unnecessarily increases the cost of enabling and disabling CATV service to the subscriber.

Furthermore, CATV service providers terminate CATV service to subscribers in response to the non-payment for CATV services. The termination of the CATV service sometimes motivates the subscriber to pay the CATV bill, resulting in the need to subsequently re-enable the CATV service. Such disabling and re-enabling requires more truck rolls, which further diminishes the profit due to cost of the truck rolls. In actuality, the cost of such truck rolls may discourage the CATV service provider from discontinuing service to many subscribers who have failed to pay, or the discontinuance of service may be delayed for a substantial amount of time during which the non-paying subscriber may continue to enjoy the CATV services provided. All of these factors diminish the profit of the CATV service provider.

Past attempts have been made by CATV service providers to remotely enable and disable a subscriber's CATV service. Such past attempts have involved the use of remotely controllable cable taps that were part of the CATV network infrastructure at a location separated from the subscriber premises. The remotely controllable cable tap and had multiple ports for connection of multiple drop cables, with each drop cable connecting to a different subscriber premises. An out of CATV frequency band downstream control signal was sent by the CATV service provider to each of the controllable cable taps, and the control signal was intended to be interpreted by the controllable cable tap to enable or disable the conduction of CATV signals to each of its connection ports separate from each of the other connection ports. When enabled, a connection port of the controllable cable tap was intended to conduct downstream CATV signals to the subscriber premises connected to that connection port, as well as to conduct upstream CATV signals from the subscriber premises to the CATV network infrastructure.

In actual use, remotely controllable cable taps never functioned on a consistent and reliable basis, and therefore never gained significant acceptance. A malfunction or discrepancy in functionality typically had the effect of adversely affecting many of the connection ports and consequently many of the multiple subscribers connected to that particular controllable cable tap. Thus, an attempt to disable the service to one particular subscriber may have had the effect of terminating the service to other subscribers for whom the CATV service was intended to be continued. Sometimes, the wrong connection port was disabled, thereby terminating the service to an acceptable subscriber while failing to terminate the service to an unacceptable subscriber. Similar problems were encountered in attempts to enable CATV service. In a significant number of circumstances, service could not be re-enabled. Thus even in these circumstances truck rolls were required to manually achieve the connectivity that was intended to be achieved remotely. Because of the potential for adversely impacting the CATV service to multiple subscribers arising from a malfunction or erroneous function within such remotely controllable cable taps, the costs associated with truck rolls and CATV technician service calls under such circumstances outweighed any benefits, and as a consequence there was no significant profit benefit to CATV service providers in using remotely controllable cable taps. Furthermore, remotely controllable cable taps provided no capability to permit some level of service to the subscriber while preventing other levels of service, since the remotely controllable cable tap either entirely permitted or entirely discontinued CATV service of all levels and types.

SUMMARY OF THE INVENTION

The present invention relates to a CATV entry adapter which permits a CATV service provider to remotely enable and disable CATV service to a single subscriber premises. Costly truck rolls to enable, disable and reenable CATV service are avoided, because disabling and reenabling is achieved by a single directly addressed command signal communicated directly to the CATV entry adapter at the subscriber's premises. The capability to remotely enable and disable CATV service without dispatching a CATV technician to the subscriber premises reduces the costs of the CATV service provider, thereby allowing for more efficient, more profitable, more timely and more reliable control over the CATV service provided to subscribers, while maintaining a high quality of service to other CATV subscribers. Furthermore, the present invention permits selectively disabling and enabling one or more different levels or types of CATV service to the subscriber without the need to disable or enable entirely all types of CATV service to the CATV subscriber. For example, the present invention permits standard CATV service to be disabled while allowing the customer continued access to telephone service, such as important "life-line" emergency telephone service.

One aspect of the invention involves a CATV entry adapter having an entry port for connection to a CATV network and a plurality of subscriber device ports for connection to subscriber devices. The adapter includes a selectable switch which has a pass-through state and a terminated in state. The selectable switch communicates upstream and downstream CATV signals between the CATV network and the subscriber devices when in the pass-through state, and the selectable switch does not communicate upstream and downstream CATV signals between the CATV network and the subscriber devices when in the terminated state. A control circuit is connected to control the state of the selectable switch and is associated with a network address. The control receives downstream CATV signals including predetermined command signal packets. The control circuit is operative to respond to a first predetermined command signal packet addressed to the network address of the control circuit from the CATV network to set the selectable switch into the pass-through state. The control circuit is operative to respond to a second predetermined command signal packet addressed to the network address of the control circuit from the CATV network to set the selectable switch into the terminated state.

Other aspects of the invention involve; a directional coupler which splits the downstream CATV signals into two copies, one copy supplied to the control circuit and the other copy is supplied to the subscriber device ports, the copy supplied to the subscriber device ports is less attenuated than the copy supplied to the control circuit; a first splitter which divides the downstream CATV signals into multiple copies which are supplied to the plurality of subscriber device ports; a termination resistor electrically connected between the termination terminal of the selectable switch and an electrical ground which dissipates power contained in the downstream CATV signals when the selectable switch is in the terminated state; an eMTA port adapted for connection to an eMTA device, a second splitter which splits the downstream CATV signals into two copies, one for the subscriber device ports and the other for the eMTA port; connecting MoCA-enabled devices as the subscriber devices to the subscriber device ports, and a MoCA frequency rejection filter to prevent MoCA signals from the subscriber device ports from reaching the entry port; parallel upstream and downstream communication paths between the selectable switch and the first splitter; first and second diplexers which define ends of the parallel upstream and downstream communication paths.

Another aspect of the invention involves a method for selectively and remotely enabling or disabling CATV service at a subscriber premises to allow or prevent a CATV entry adapter from communicating downstream CATV signals from a CATV network to a plurality of subscriber device ports adapted to connect to subscriber devices. The method involves connecting an entry port of the CATV entry adapter to the CATV network; connecting at least one subscriber device to one of the subscriber device ports; communicating the downstream CATV signals from the entry port through the selectable switch to the subscriber devices ports in a pass-through state of the selectable switch; communicating the downstream CATV signals from the entry port through the selectable switch to a termination resistor instead of the subscriber device ports in a terminated state of the selectable switch; receiving a first predetermined command signal packet from the CATV network containing a network address associated with the CATV entry adapter that causes the selectable switch to enter the pass-through state; and receiving a second predetermined command signal packet from the CATV network containing a network address associated with the CATV entry adapter that causes the selectable switch to enter the pass-through state.

Further aspects of the invention involve: connecting a plurality of MoCA-enabled subscriber devices to the subscriber device ports, communicating MoCA signals between the MoCA-enabled subscriber devices through the CATV entry adapter independently of the state of the selectable switch, and preventing the communication of MoCA signals from the subscriber device ports to the entry port; receiving the predetermined command signal packets by a control circuit within the CATV entry adapter, selectively setting the state of the selectable switch by the control circuit in response to receiving the predetermined command signal packets containing the network address associated with the CATV entry adapter, communicating the downstream CATV signals between the entry port and the plurality of subscriber device ports through a through leg of a directional coupler, and communicating the predetermined command signal packets from the CATV network to the control circuit through a tap leg of the directional coupler.

Still further aspects of the invention involve connecting an eMTA device to an eMTA port of the CATV entry adapter and communicating the downstream CATV signals from the entry port to the eMTA port; communicating the downstream CATV signals from the entry port to the eMTA port independently of the state of the selectable switch; using active electronic components in a downstream communication path between the entry port and the subscriber device ports to amplify the downstream CATV signals, supplying power to the CATV entry adapter to power the active electronic components, recognizing a loss of power to the CATV entry adapter when connected to the cable television network and in response substituting a termination impedance characteristic for the downstream communication path.

Other and different statements and aspects of the invention appear in the following claims. A more complete appreciation of the present invention, as well as the manner in which the present invention achieves the above and other improvements, can be obtained by reference to the following detailed description of presently preferred embodiments taken in connection with the accompanying drawings, which are briefly summarized below, and by reference to the appended claims.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
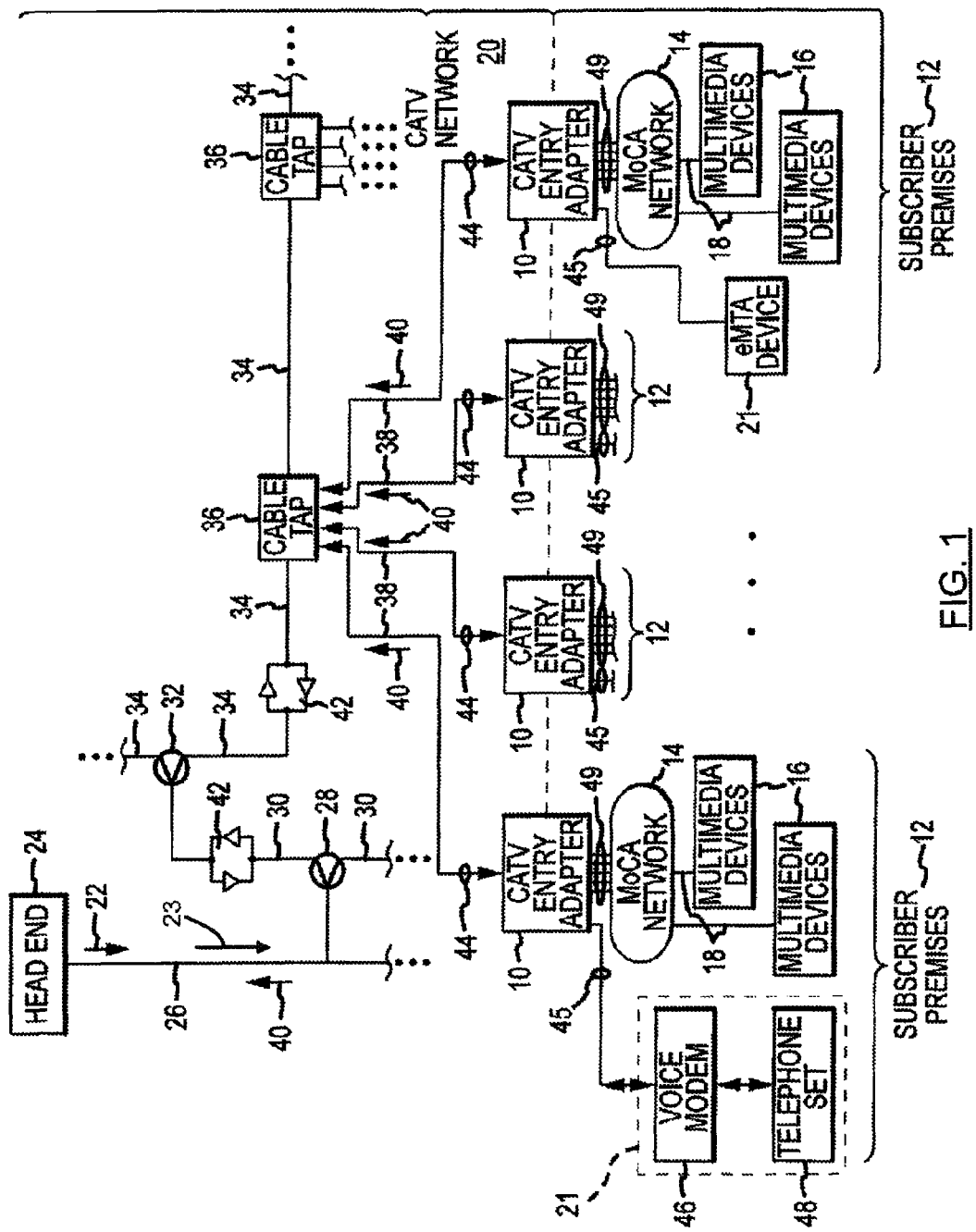
FIG. 1 is a block diagram illustrating a plurality of CATV entry adapters which incorporate the present invention, some of which are shown interconnecting a CATV network and a MoCA in-home network located at subscriber premises.

A community access television or cable television (CATV) entry adapter 10 which incorporates the present invention is shown generally in FIG. 1. The CATV entry adapter 10 is located at or in a CATV subscriber's premises 12 and forms a part of a conventional Multimedia over Coax Alliance (MoCA) in-home entertainment network 14. Multimedia devices 16 are interconnected by the MoCA network 14 in the subscriber premises 12. The multimedia devices 16 communicate multimedia content or MoCA signals between one another using the MoCA network 14. The MoCA network 14 is formed in part by the preexisting coaxial cable infrastructure (represented generally by coaxial cables 18) present in the subscriber premises 12. Examples of multimedia devices 16 are digital video recorders, computers, data modems, computer game playing devices, television sets, television set-top boxes, and other audio and visual entertainment devices. In general, the multimedia devices 16 constitute subscriber devices.

The CATV entry adapter 10 is also a part of a conventional CATV network 20. The CATV entry adapter delivers CATV content or signals from the CATV network 20 to subscriber devices at the subscriber premises 12. In addition to the multimedia devices 16, the subscriber devices may also include other devices which do not operate as a part of the MoCA network 14 but which are intended to function as a result of connection to the CATV network 20. Examples of subscriber devices which are normally not part of the MoCA network 14 are eMTA devices 21 which are exemplified by a voice modem 46 and connected telephone set 48.

The CATV entry adapter 10 has beneficial characteristics which allow it to function in multiple roles simultaneously in both the MoCA network 14 and in the CATV network 20, thereby benefiting both the MoCA network 14 and the CATV network 20. The CATV entry adapter 10 functions as a hub in the MoCA network 14, to effectively transfer MoCA signals between the multimedia devices 16. The CATV entry adapter 10 also functions in a conventional role as an interface between the CATV network 20 and the subscriber devices located at the subscriber premises, thereby facilitating CATV service to the subscriber. In addition, the CATV entry adapter 10 effectively prevents MoCA signals from the MoCA network 14 from interfering with and degrading the functionality and performance of the eMTA device 21, thereby assuring that the intended functionality of the connected eMTA device will be maintained even though a MoCA network 14 is connected to and interacts with the entry adapter 10.

The CATV entry adapter 10 disables and enables communication between the CATV network 20 and the subscriber devices in response to disable and enable command signal packets 23 received by the CATV entry adapter 10 from the CATV network 20. A CATV service provider sends disable or enable command signal packets 23 to the CATV entry adapter 10 to disable or enable CATV service to the subscriber. The CATV service provider realizes a substantial cost savings by remotely disabling or enabling CATV service compared to dispatching a CATV technician to disable or enable the subscriber's CATV service. The disabling or enabling of CATV communication through the CATV entry adapter 10 does not otherwise interfere with the operation of the CATV entry adapter 10 as a hub in the MoCA network 14. These and other improvements and functions are described in greater detail below.

The CATV network 20 shown in FIG. 1 has a typical topology. Downstream signals 22 originate from programming sources at a headend 24 of the CATV network 20, and are conducted to the CATV entry adapter 10 in a sequential path through a main trunk cable 26, a signal splitter/combiner 28, secondary trunk cables 30, another signal splitter/combiner 32, distribution cable branches 34, cable taps 36, and drop cables 38. Upstream signals 40 are delivered from the CATV entry adapter 10 to the CATV network 20, and are conducted to the headend 24 in a reverse sequence. Interspersed at appropriate locations within the topology of the CATV network 20 are conventional repeater amplifiers 42, which amplify both the downstream signals 22 and the upstream signals 40. Conventional repeater amplifiers may also be included in the cable taps 36. The cable taps 36 and signal splitter/combiners 28 and 32 divide a single downstream signal into multiple separate downstream signals, and combine multiple upstream signals into a single upstream signal.

The CATV entry adapter 10 receives the downstream signals 22 from the CATV network 20 at a CATV network connection entry port 44. Passive downstream signals are conducted through the CATV entry adapter 10 to the eMTA device 21 without amplification, enhancement, modification or other substantial conditioning. Passive downstream signals are delivered from an eMTA port 45 to the eMTA device 21 represented by the voice modem 46 connected to the telephone set 48.

The CATV entry adapter 10 also conducts downstream CATV signals to multiple subscriber device ports, collectively referenced at 49. (but individually referenced at 50, 52, 54 and 56 in FIGS. 2-7). The downstream CATV signals are divided into multiple copies, and a copy is delivered to each of the subscriber device ports 49. Similarly, multiple upstream CATV signals are received from the subscriber device ports 49 and combined into a single upstream CATV signal for delivery to the CATV network 20. Various types of subscriber devices are connected to the subscriber device ports 49. Typically, the subscriber devices will be the multimedia devices 16 connected as part of the MoCA network 14. However, a subscriber device does not have to be MoCA-enabled. An example of a non-MoCA-enabled subscriber device is a television set directly connected to a subscriber device port 49 of the CATV entry adapter without the use of a MoCA interface. In this example, the non-MoCA enabled television set would not be a part of the MoCA network 14. The subscriber devices receive the downstream CATV signals from the CATV entry adapter 10 and supply the upstream CATV signals to the CATV entry adapter 10 through the subscriber device ports 49.

In some embodiments of the present invention, the subscriber device ports 49 are active ports through which active downstream and upstream signals are conducted. Active downstream signals are amplified, filtered, modified, enhanced or otherwise conditioned by power-consuming active electronic circuit components within the CATV entry adapter 10, such as an amplifier, for example. Active upstream signals may be filtered, enhanced or conditioned by active electronic components but are typically not also amplified. In other embodiments of the present invention the subscriber device ports 49 are passive ports through which passive downstream and upstream signals are conducted without amplification, enhancement, modification or other substantial conditioning by the CATV entry adapter 10. The eMTA port 45 typically receives a less attenuated passive downstream CATV signal than the subscriber device ports 49 receive in the embodiments where the subscriber device ports 49 are also passive. Likewise, the CATV network 20 typically receives a less attenuated passive upstream CATV signal from the eMTA port 45 than from the subscriber device ports 49 in the embodiments where the subscriber device ports 49 are also passive. For these reasons, the eMTA port 45 is distinguished from the passive subscriber device ports 49, to encourage the connection of the eMTA device 21 to the eMTA port 45 instead of the passive subscriber device ports 49, resulting in higher quality phone service to the subscriber. Connection of the eMTA device 21 to the subscriber device ports 49 which are active is strongly discouraged because those active ports are not functional under conditions of power loss to the CATV entry adapter 10.

Figure 2:
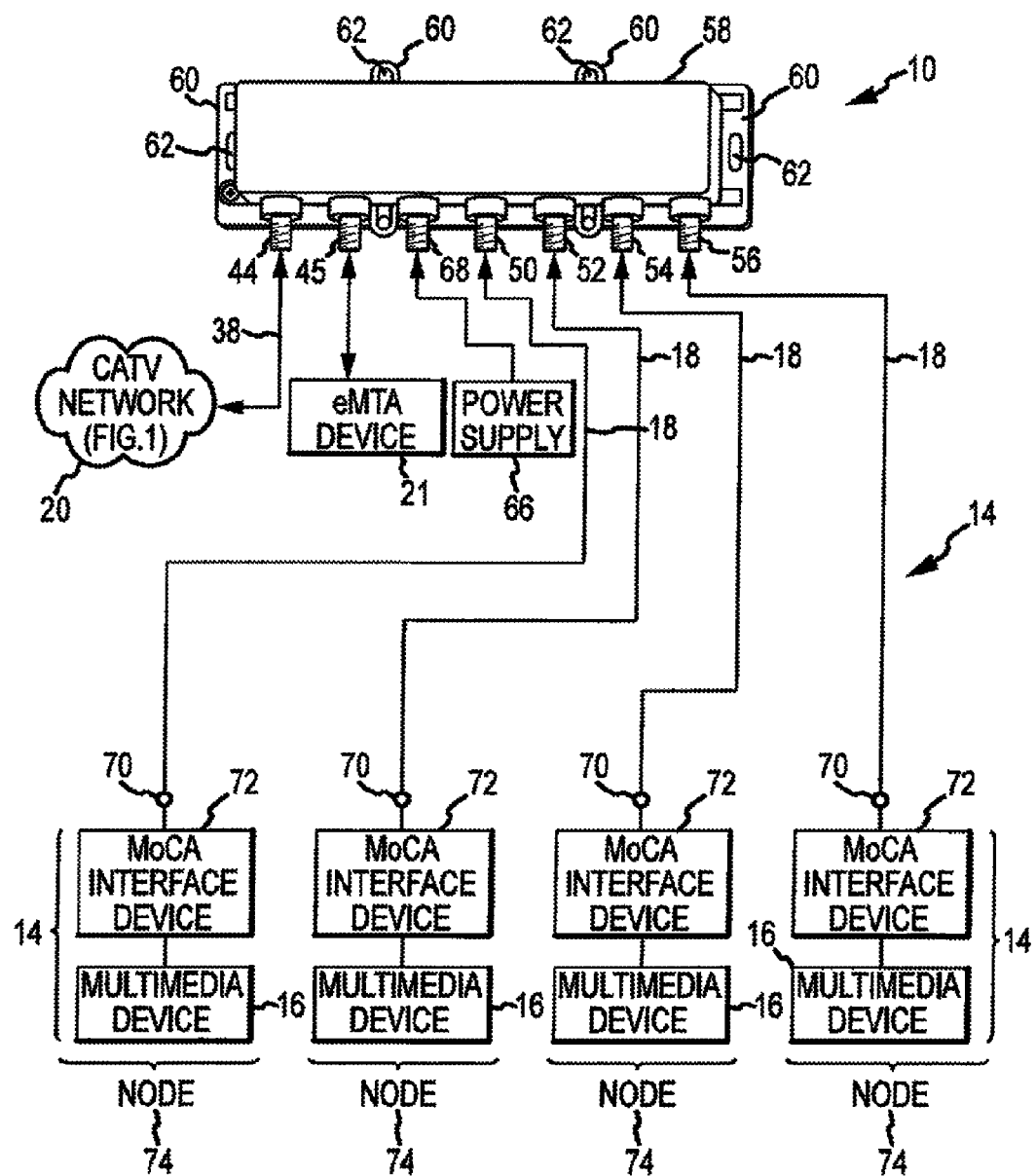
FIG. 2 is a generalized perspective view of one CATV entry adapter shown in FIG. 1 in a subscriber premises, connected to the MoCA network and to subscriber device shown in block diagram form.

More details concerning the CATV entry adapter 10 are shown in FIG. 2. The CATV entry adapter 10 includes a housing 58 which encloses internal electronic circuit components (shown in FIGS. 3-7). A mounting flange 60 surrounds the housing 58 and holes 62 in the flange 60 allow attachment of the CATV entry adapter 10 to a support structure at the subscriber premises. Electrical power for the active components of the CATV entry adapter 10 is supplied from a conventional DC power supply 66 connected to a dedicated power input port 68. Alternatively, electrical power can be supplied through a conventional power inserter (not shown) that is connected to one of the subscriber device ports 50, 52, 54 or 56. The power inserter allows relatively low voltage DC power to be conducted through the same port that also conducts high-frequency signals. Use of a conventional power inserter eliminates the need for a separate dedicated power supply port 68, or provides an alternative port through which electrical power can also be applied. The power supply 66 or the power supplied from the power inserter is typically derived from a conventional wall outlet (not shown) within the subscriber premises. The CATV network 20 is connected to the CATV network connection entry port 44 of the CATV entry adapter 10.

The ports 44, 45, 50, 52, 54, 56 and 68 are each preferably formed by a conventional female coaxial cable connector which is mechanically connected to the housing 58 and which is electrically connected to internal components of the CATV entry adapter 10. Coaxial cables 18 from the subscriber premises cable infrastructure and the drop cables 38 (FIG. 1) are connected to the CATV entry adapter 10 by mechanically connecting the corresponding mating male coaxial cable connectors (not shown) on these coaxial cables to the female coaxial cable connectors forming the ports 44, 45, 50, 52, 54, 56 and 68.

One CATV entry adapter 10 is located at each subscriber premises. The number of eMTA and subscriber device ports 45, 50, 52, 54 and 56 is dictated by the number of coaxial cables 18 which are routed throughout the subscriber premises. Although the CATV entry adapter 10 shown in FIG. 2 includes seven ports, other entry adapters have a larger or smaller number of ports. The number and routing of the coaxial cables 18 within the subscriber premises constitute the in-home or subscriber premise cable infrastructure that is used by the MoCA network 14 (FIG. 1).

Each of the coaxial cables 18 of the in-home cable infrastructure terminates at a cable outlet 70. Those coaxial cables 18 which are not currently in use are terminated with an appropriate termination resistor (not shown) located at the cable outlet 70 of these coaxial cable 18. In most cases however, the cable outlet 70 of the coaxial cable 18 is connected to a MoCA interface device 72 to which a separate multimedia device 16 is connected.

Each MoCA interface device 72 is a conventional item presently available for purchase and use. Each MoCA interface device 72 contains a controller which is programmed with the necessary functionality to implement the MoCA communication protocol. Each MoCA interface device 72 is connected between the cable outlet 70 and a multimedia device 16. When the multimedia device 16 creates output signals, those output signals are encapsulated or otherwise embodied in MoCA signals 73 created by the MoCA interface device 72, and then those MoCA signals 73 are transmitted by one MoCA interface device 72 through the coaxial cables 18 of the in home cable infrastructure, through the CATV entry adapter 10 acting as a MoCA network hub, and to another receiving MoCA interface device 72 in the MoCA network 14 at the subscriber premises. The receiving MoCA interface device 72 extracts the original output signals that were originally encapsulated or otherwise embodied in the MoCA signals 73, and the receiving MoCA interface device 72 supplies those original output signals to the multimedia device 16 to which the receiving MoCA interface device 72 is attached. The receiving MoCA interface device 72 may send administrative signals back to the original transmitting MoCA interface device to confirm receipt of the MoCA signals 73 and otherwise provide information, such as signal strength. In this manner, MoCA signals 73 which contain the multimedia content from one multimedia device 16 are communicated through the MoCA network 14 (FIG. 1) to another MoCA-enabled multimedia device 16 for use at its location. Functioning in this manner, and in terms of the conventional terminology used in the field of networks, the MoCA interface device 72 and the multimedia device 16 form one node 74 of the MoCA network 14. MoCA signals 73 are communicated in this manner between the different MoCA nodes 74 of the MoCA network 14.

Although the MoCA interface devices 72 are shown as separate from the multimedia devices 16, each MoCA interface device 72 is typically incorporated within as an integral part of each MoCA-enabled multimedia device 16. However, for those multimedia devices 16 which do not include a built-in MoCA interface device 72, a separate MoCA-enabled device 72 is available to be connected to the multimedia device 16 and thereby allow it to participate as a node in the MoCA network 14.

Several embodiments of the CATV entry adapter 10 are described below with reference to FIGS. 3-8. The CATV entry adapters 10a, 10b, 10c, and 10f shown in FIGS. 3-5 and 8, respectively, have passive subscriber device ports 50, 52, 54 and 56 while the CATV entry adapters 10d and 10e, shown in FIGS. 6 and 7, respectively, have active subscriber device ports 50, 52, 54 and 56. The CATV entry adapters 10a, 10b, 10c, and 10f are generally referred to as passive CATV entry adapters due to the subscriber device ports 50, 52, 54 and 56 receiving passive downstream CATV signals. The CATV entry adapters 10d and 10e are generally referred to as active CATV entry adapters due to the subscriber device ports 50, 52, 54 and 56 receiving active downstream CATV signals. A CATV service provider may choose to supply a subscriber with either a passive or an active CATV entry adapter depending on the quality of the downstream CATV signals receivable at the subscriber premises 12 (FIG. 1), among other considerations.

Figure 3:
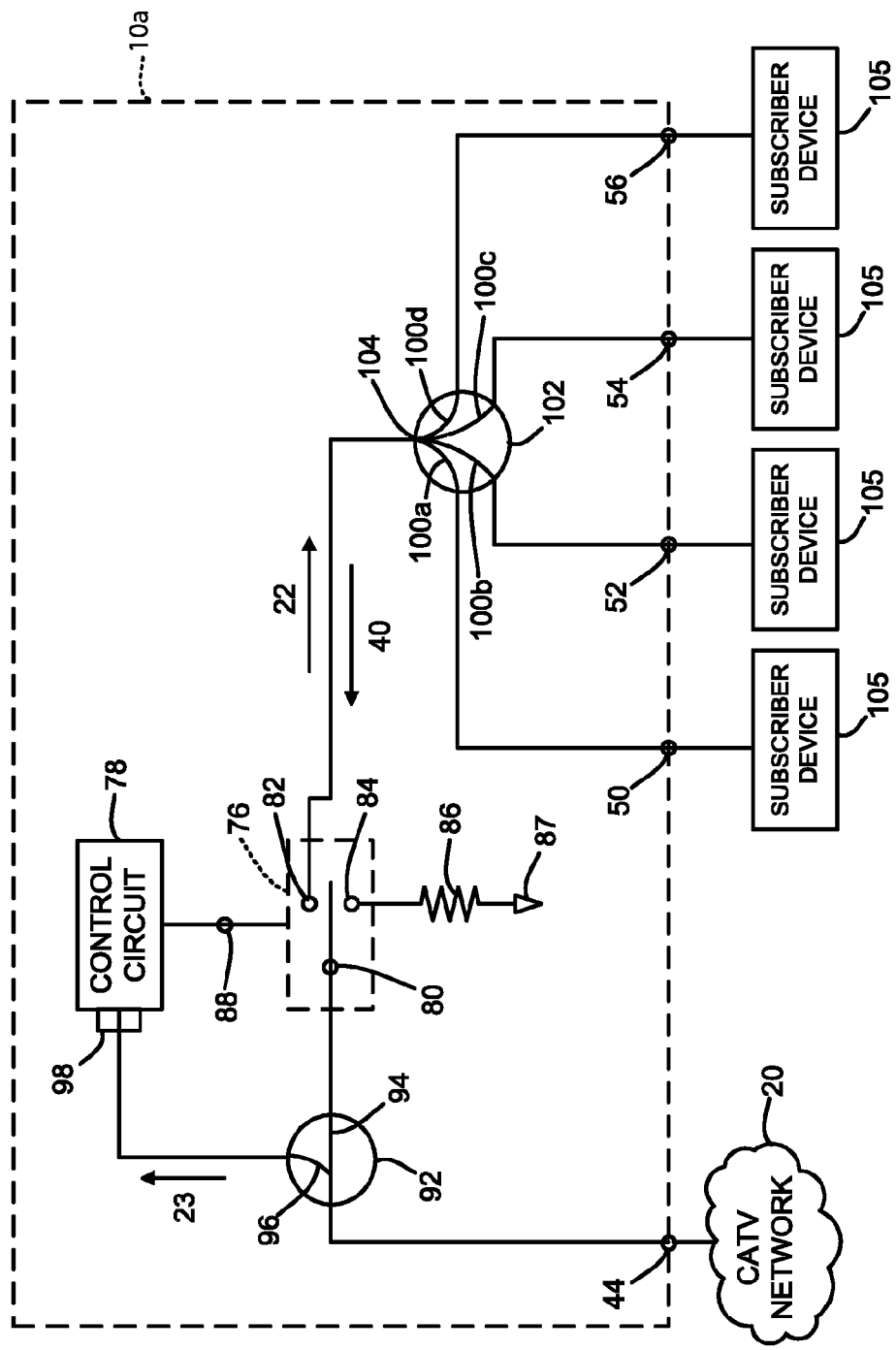
FIG. 3 is a block diagram of functional components of a CATV entry adapter which embodies the present invention, shown connected to the CATV network and to the subscriber device.

The CATV entry adapter 10a shown in FIG. 3 contains a selectable switch 76 which is operated by a control circuit 78. The selectable switch 76 has an input terminal 80, a pass-through terminal 82 and a termination terminal 84. The termination terminal 84 is connected to a termination resistor 86 which is further connected to a ground 87 of the CATV entry adapter 10a.

The selectable switch 76 has two different states which are selectable by the control circuit 78. In a first, or pass-through state of the selectable switch 76, the input terminal 80 is connected to the pass-through terminal 82 creating an electrical connection between the input terminal 80 and the pass-through terminal 82. While the selectable switch 76 is in the pass-through state, CATV signals are conducted between the entry port 44 and the subscriber device ports 50, 52, 54 and 56. In a second, or terminated state of the selectable switch 76, the input terminal 80 is connected to the termination terminal 84. While the selectable switch 76 is in the terminated state, downstream CATV signals from the entry port 44 are conducted to and dissipated by the termination resistor 86 and are therefore not conducted to the subscriber device ports 50, 52, 54 and 56.

When the selectable switch 76 is in the pass-through state, the CATV entry adapter 10a and the CATV service to the subscriber are considered enabled. When the selectable switch 76 is in the terminated state, the CATV entry adapter 10a and the CATV service to the subscriber are considered disabled.

The control circuit 78 is assigned a specific network address which is different from the network addresses assigned to other CATV entry adapters connected to the same CATV network 20. The control circuit 78 is preferably a micro-computer chip, but may also be constructed from other electronic components. The control circuit 78 responds to at least two predetermined command signal packets 23 which are specifically addressed to the control circuit 78. The two predetermined command signal packets 23 cause the control circuit 78 to set the selectable switch 76 into either the pass-through or the terminated state. The CATV service provider can enable or disable the CATV service to a subscriber by sending the appropriate one of the two predetermined command signal packets 23 to the network address associated with the subscriber's CATV entry adapter 10.

When the control circuit 78 receives one of the two predetermined command signal packets 23 addressed to the control circuit 78, the control circuit 78 responds by either asserting or deasserting an activation signal 88 which causes the selectable switch 76 to achieve the requested pass-through or terminated state, if the selectable switch 76 is not already in the requested state. The control circuit 78 maintains the activation signal 88 in the asserted state until the control circuit 78 receives the predetermined disable signal. The control circuit 78 maintains the activation signal 88 in the deasserted state until the control circuit 78 receives the predetermined enable signal. The control circuit 78 and the selectable switch 76 require power to achieve their respective functionality. The selectable switch 76 assumes the terminated state if power to the CATV entry adapter 10a is interrupted.

The predetermined command signal packets 23 reach the control circuit 78 by passing though the entry port 44 and a directional coupler 92. The directional coupler 92 has a through leg 94 and a tap leg 96. The through leg 94 is directly connected to the input terminal 80 of the selectable switch 76. The tap leg 96 is directly connected to an input terminal 98 of the control circuit 78. The directional coupler 92 essentially splits the downstream CATV signals 22 received from the entry port 44 into two copies, one of which is conducted to the tap leg 96 and the other of which is conducted to the through leg 94. The downstream CATV signals 22 conducted to the through leg 94 are not substantially attenuated while the downstream CATV signals 22 conducted through the tap leg 96 are moderately attenuated. Although the downstream CATV signals 22 conducted to the tap leg 96 and the connected input terminal 98 of the control circuit 78 are moderately attenuated, the signals 22 which constitute the predetermined command signal packets 23 are still strong enough to be recognized and interpreted by the control circuit 78. The directional coupler 92 is used to split the downstream CATV signals 22 instead of a conventional two-way splitter because passing the downstream CATV signals 22 through the through leg 94 of the directional coupler 92 results in less signal attenuation than does passing those signals through a two-way splitter.

Each of the subscriber device ports 50, 52, 54 and 56 is connected to one of four terminal legs 100a-100d of a four-way splitter 102. Signals received at a common terminal 104 of the four-way splitter 102 are divided into four identical copies, one of which is conducted to each of the four terminal legs 100a-100d. Likewise, signals received at the terminal legs 100a-100d are combined into a single signal which is conducted through the common terminal 104. Subscriber devices 105 are connected to the subscriber device ports 50, 52, 54 and 56 and receive multimedia content embedded within the downstream CATV signals 22.

The CATV entry adapter 10a (FIG. 3) is passive and does not include a separate eMTA port 45 (FIGS. 2, 4-7). Downstream CATV signals 22 are conducted directly from the pass-through terminal 82 of the selectable switch 76 to the common terminal 104 of the four-way splitter 102, without any conditioning, amplification or enhancement. Upstream CATV signals 40 are conducted from the subscriber devices 105 connected to the subscriber device ports 50, 52, 54 and 56, through the four-way splitter 102 to the pass-through terminal 82 of the selectable switch 76.

When the CATV entry adapter 10a receives the predetermined command signal packet 23 addressed to the network address corresponding to the control circuit 78 to disable the adapter 10a, the control circuit 78 deasserts the activation signal 88 causing the selectable switch 76 to enter the terminated state and thus disabling the adapter 10a. When the CATV entry adapter 10a is disabled, CATV signal communication between the entry port 44 and the subscriber device ports 50, 52, 54 and 56 does not occur. Likewise, when the CATV entry adapter 10a receives the predetermined command signal packet 23 addressed to the network address corresponding to the control circuit 78 to enable the adapter 10a, the control circuit 78 asserts the activation signal 88 causing the selectable switch 76 to enter the pass through state and thus enabling the adapter 10a. CATV signal communication between the entry port 44 and the subscriber device ports 50, 52, 54 and 56 occurs only when the CATV entry adapter 10 is enabled.

The CATV entry adapter 10a is suitable for subscribers whose premises receive a sufficiently strong downstream CATV signal 22 that does not require further amplification and who do not desire or have access to phone service through the CATV service provider.

Figure 4:
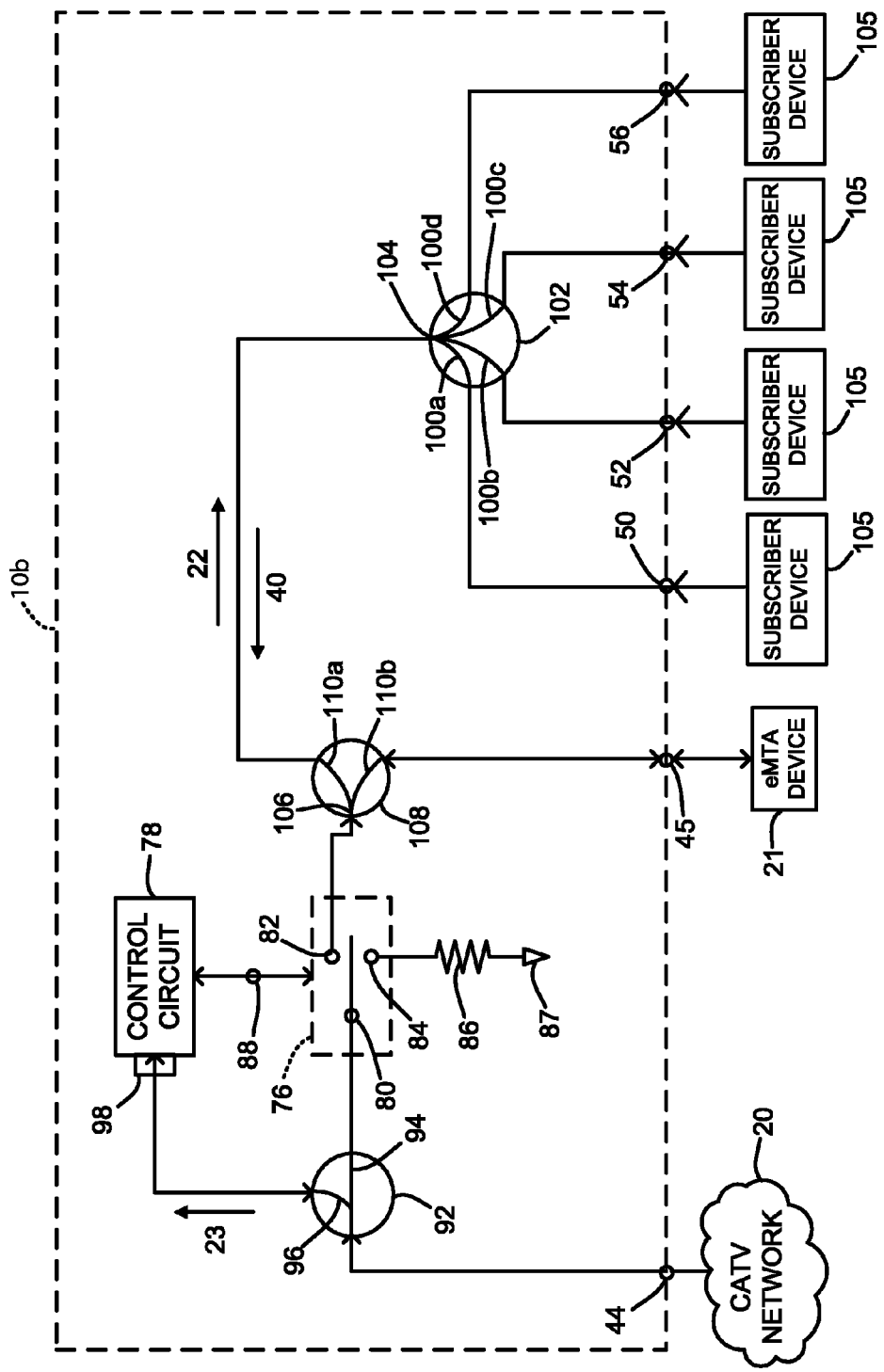
FIG. 4 is a block diagram of functional components of a CATV entry adapter similar to the one shown in FIG. 3, additionally shown connected to an eMTA device.

The CATV entry adapter 10b shown in FIG. 4 is similar to the adapter 10a (FIG. 3) and additionally includes an eMTA port 45. The eMTA port 45 is connected to an eMTA device 21 which the subscriber uses to receive phone service from the CATV network 20. A common terminal 106 of a two-way splitter 108 is connected to the pass-through terminal 82 of the selectable switch 76. A first terminal leg 110a of the two-way splitter 108 is connected to the common terminal 104 of the 4-way splitter 102. A second terminal leg 110b of the two-way splitter 108 is connected to the eMTA port 45. Downstream CATV signals 22 received at the common terminal 106 of the two-way splitter 108 are split into two identical copies, one of which is conducted to the terminal leg 110a and the other of which is conducted to the terminal leg 110b. Separate upstream CATV signals 40 received at the terminal legs 110a and 110b are combined by the two-way splitter 108 into a single upstream CATV signal 40 which is conducted through the common terminal 106.

The enabling or disabling of the CATV entry adapter 10b has the same effect on the ability of the subscriber device ports 50, 52, 54 and 56 to communicate CATV signals with the CATV network 20 as previously described for the CATV entry adapter 10a (FIG. 3). Additionally, since CATV signals 22/40 communicated between the entry port 44 and the eMTA port 45 must pass through the selectable switch 76, disabling or enabling the CATV entry adapter 10 also disables or enables CATV communication to the eMTA port 45 and the connected eMTA device 21.

The CATV entry adapter 10b is suitable for subscribers whose premises receive a sufficiently strong downstream CATV signal that does not require amplification and who are supplied phone service through the CATV service provider.

Figure 5:
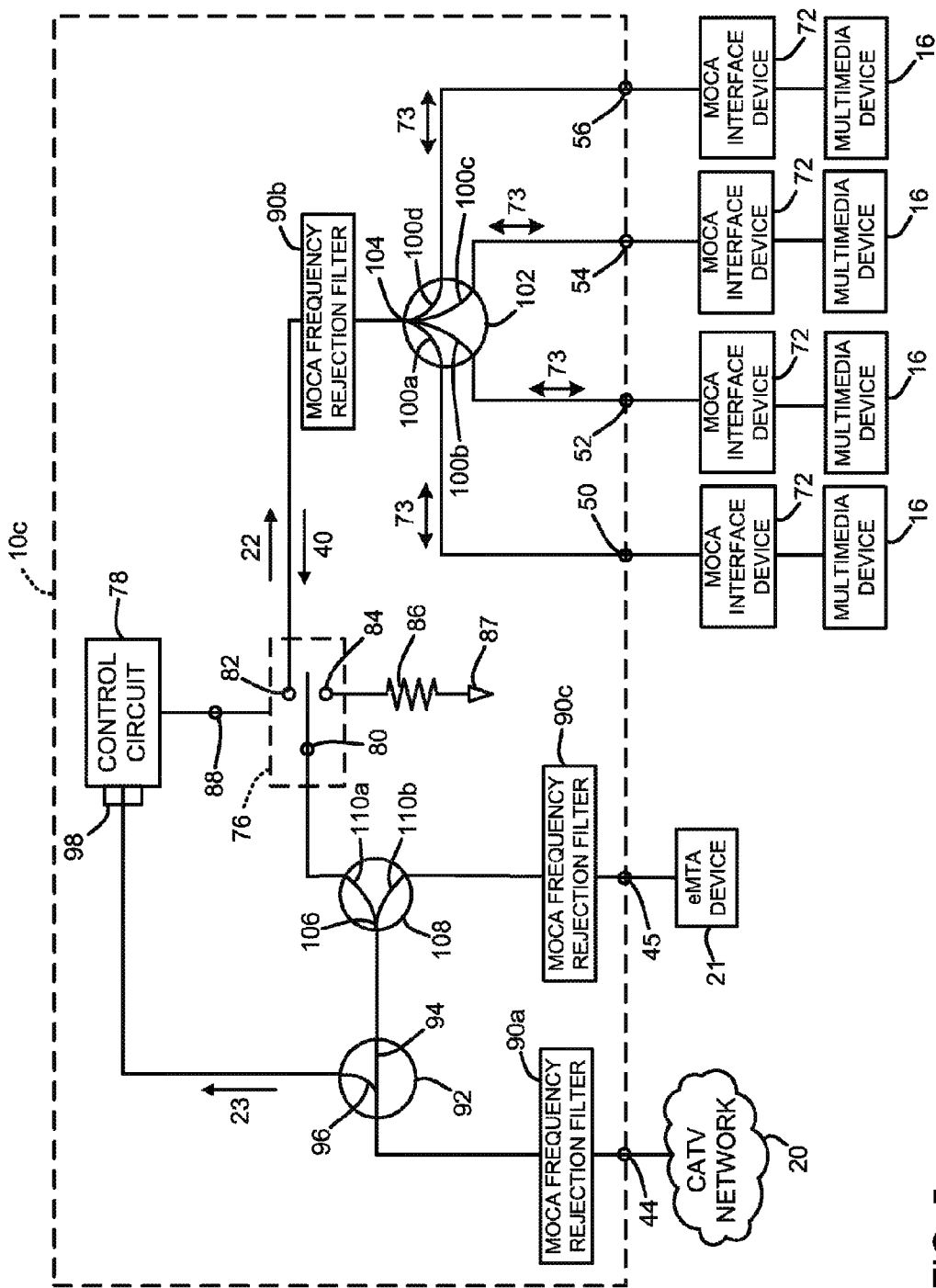
FIG. 5 is a block diagram of functional components of a CATV entry adapter similar to the one shown in FIG. 4, additionally connected to MoCA-enabled devices.

The CATV entry adapter 10c shown in FIG. 5 is similar to the CATV entry adapter 10b (FIG. 4), except that CATV communication between the entry port 44 and the eMTA port 45 does not occur through the selectable switch 76. The common terminal 106 of the two-way splitter 108 is connected to the through leg 94 of the directional coupler 92; the first terminal leg 110a of the two-way splitter 108 is connected to the input terminal 80 of the selectable switch 76 and the second terminal leg 110b of the two-way splitter 108 is in communication with the eMTA port 45.

Since CATV communication between the entry port 44 and the eMTA port 45 does not occur through the selectable switch 76, the eMTA device 21 connected to the eMTA port 45 has a communication path to the CATV network 20 irrespective of whether the CATV entry adapter 10c is enabled or disabled. The disabling or enabling of the CATV entry adapter 10c only affects the subscriber device ports 50, 52, 54 and 56 and does not affect the eMTA port 45.

An additional distinction between the CATV entry adapters 10c and 10b (FIG. 4), is that the subscriber device ports 50, 52, 54 and 56 are adapted for connection to MoCA interface devices 72 and multimedia devices 16. The multimedia devices 16 may or may not be dependent upon CATV service from the CATV service provider to operate. The multimedia devices 16 include such devices as television sets, computers, digital video recording (DVR) devices, game consoles, and other devices. The multimedia devices 16 may be located in different areas of the subscriber premises. The utility of the multimedia devices 16 is often enhanced by allowing the communication of multimedia content between the multimedia devices 16. For example, the utility of a DVR device is enhanced by allowing the DVR device to communicate multimedia content to multiple television sets located throughout the subscriber premises. As another example, the utility of a radio receiver is enhanced by allowing the communication of audio content to multiple speaker devices which may be located throughout the subscriber premises.

The desire to interoperate multiple multimedia devices 16 throughout a home or subscriber premises has led to the creation of the Multimedia over Coax Alliance (MoCA). MoCA has developed specifications for products to create an in-home entertainment network for interconnecting presently-known and future multimedia devices. A MoCA in-home network uses the subscriber premise or in-home coaxial cable infrastructure originally established for distribution of CATV signals within the subscriber premises, principally because that cable infrastructure already exists in most homes and is capable of carrying much more information than is carried in the CATV frequency bands. A MoCA network is established by connecting MoCA enabled or MoCA interface devices at the cable outlets in the rooms of the subscriber premises.

The CATV entry adapter which is connected at the other end of the in-home coaxial cables serves as a hub in the subscriber premises MoCA network to distribute MoCA signals received from one coaxial cable to the other coaxial cables leading to other cable outlets and connected multimedia devices. In this manner, each MoCA enabled device may communicate with every other MoCA-enabled device in the in-home or subscriber premises MoCA network. The multimedia content is delivered throughout the subscriber premises to be displayed, played or otherwise used by a different multimedia device at a different location within the home, without having to physically relocate the originating multimedia device from one location to another within the subscriber premises.

An originating multimedia device 16 communicates multimedia content to another multimedia device by communicating that multimedia content to the attached MoCA interface device 72. The attached MoCA interface device 72 receives and encapsulates the multimedia content into signal packets or MoCA signals, and communicates these MoCA signals to the other MoCA interface devices 72. The other MoCA interface devices 72 remove the encapsulated multimedia content and present the multimedia content to the connected receiving multimedia devices 16. The MoCA signals are transmitted within a frequency band that is different from the frequency band of the CATV signals.

Two features of the CATV entry adapter 10c facilitate its use as a hub in an in-home MoCA network 14. The first feature is the relatively low signal isolation within the MoCA frequency band between the terminal legs 100a-100d of the 4-way splitter 102, which allows the MoCA signals to traverse the terminal legs 100a-100d without substantial signal attenuation. The second feature is the multiple MoCA frequency rejection filters 90a, 90b and 90c which prevent the MoCA signals from propagating down undesired signal paths. There are two concerns with MoCA signals propagating down undesired signal paths: potential interference with non-MoCA-enabled devices connected to, or internal electronic components of the CATV entry adapter 10c; and a potential compromise of privacy if the MoCA signals leak to an adjacent subscriber premises where the multimedia content within the MoCA signals could be extracted.

The MoCA frequency rejection filter 90c is connected to the common terminal 104 of the 4-way splitter 102 and substantially confines the MoCA signals from the MoCA interface devices 72 to the terminal legs 100a-100d of the 4-way splitter 102. The MoCA frequency rejection filter 90b is connected between the eMTA port 45 and the terminal leg 110b of the 2-way splitter 108. The MoCA frequency rejection filter 90b helps to prevent any MoCA signals which may have leaked past the filter 90c from reaching the eMTA device 21 and causing interference with the operation of the eMTA device 21. The MoCA frequency rejection filter 90a helps prevent any MoCA signals from the MoCA interface devices 72 which have leaked past the MoCA frequency rejection filter 90b from reaching the CATV network 20. The MoCA frequency rejection filter 90a also helps prevent any MoCA signals from an adjacent subscriber premises from entering the entry port 44 and interfering with the control circuit 78.

Of particular benefit to the subscriber of the CATV services is that the CATV entry adapter 10c still functions as a hub in the in-home MoCA network 14 even after the adapter 10c has been disabled. Since the multimedia devices 16 are not necessarily dependent upon the downstream CATV signals to operate, the multimedia devices 16 may communicate with one another through the CATV entry adapter 10c independently of the state of the selectable switch 76.

The CATV entry adapter 10c is suitable for subscribers whose premises receive a sufficiently strong downstream CATV signal that does not require further amplification, who desire phone service through the CATV service provider, and who wish to use the adapter 10c as a hub in an in-home MoCA network 14. The CATV service provider may prefer to utilize the CATV entry adapter 10c instead of the adapter 10b in situations which require some emergency phone service capability, (such as 911 access) irrespective of whether the subscriber's CATV phone service has been disabled.

Figure 6:
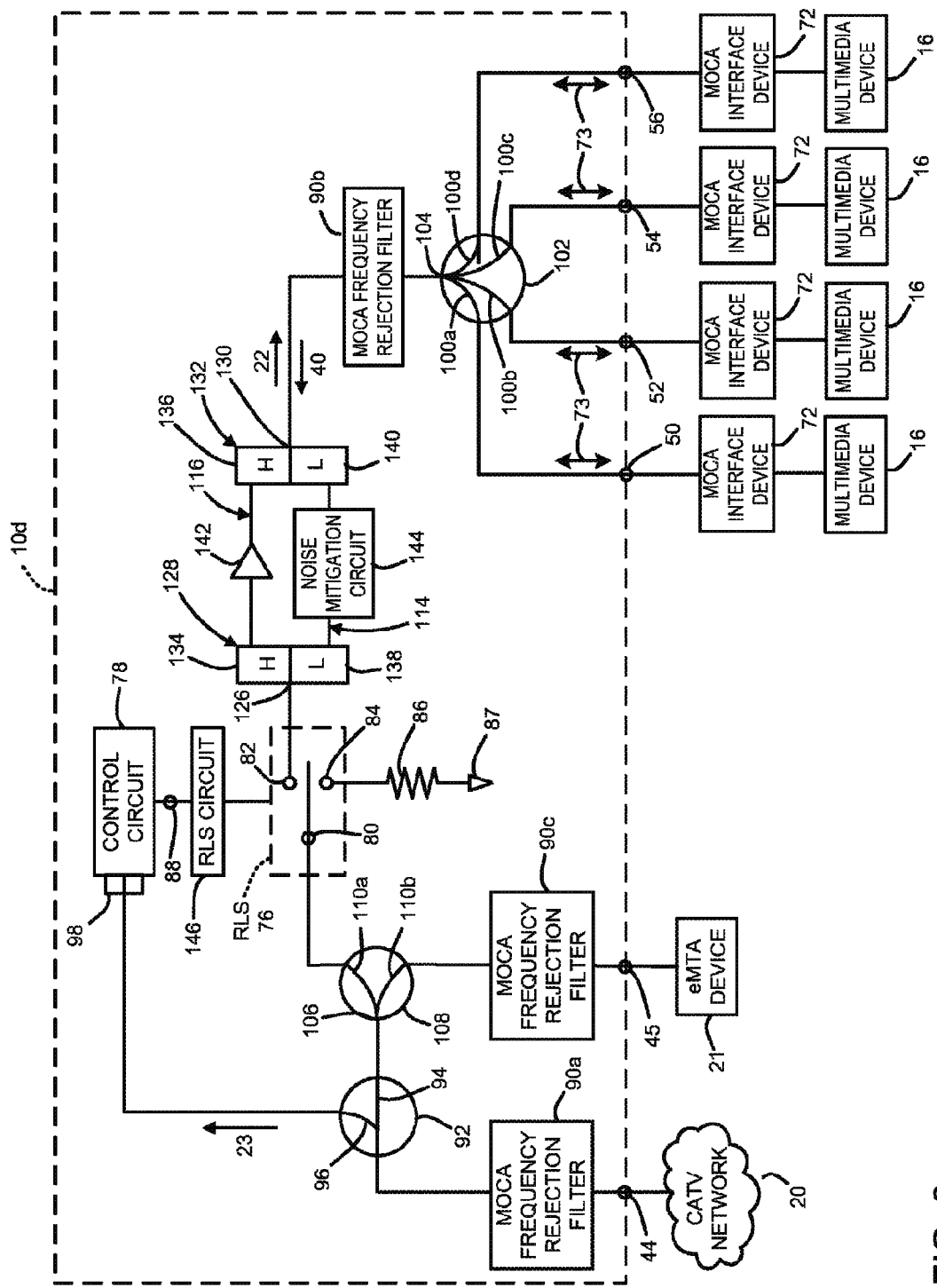
FIG. 6 is a block diagram of functional components of a CATV entry adapter similar to the one shown in FIG. 4, additionally including active electronic components.

The CATV entry adapter 10d shown in FIG. 6 is an active version of the adapter 10c (FIG. 5). In addition to the components of the CATV entry adapter 10b, the adapter 10d has parallel upstream and downstream communication paths 114 and 116 positioned between the two-way splitter 108 and the MoCA frequency rejection filter 90b. The upstream communication path 114 removes unwanted ingress noise from the upstream CATV signals 40 sent by the multimedia devices 16. The downstream communication path 116 amplifies or otherwise conditions the downstream CATV signals 22 before they are received by the multimedia devices 16.

The pass-through terminal 82 of the selectable switch 76 is connected to a common terminal 126 of a first diplexer 128. A common terminal 130 of a second diplexer 132 is connected to the MoCA frequency rejection filter 90b. The first and second diplexers 128 and 132 each have a high frequency terminal 134 and 136 and a low frequency terminal 138 and 140. The high frequency terminals 134 and 136 conduct downstream CATV signals 22 between the common terminals 126 and 130 of the respective diplexers 128 and 132 in the downstream communication path 116. The low frequency terminals 138 and 140 conduct upstream CATV signals between the common terminals 126 and 130 of the respective diplexers 128 and 132 in the upstream communication path 114.

An amplifier 142 which amplifies the downstream CATV signals 22 is connected between the high frequency terminals 134 and 136. Together, the high frequency terminals 134 and 126 and the amplifier 142 constitute the downstream communication path 116. The amplification of the downstream CATV signals 22 as the signals 22 pass through the downstream communication path 116 improves the quality and signal strength of the signals received by the multimedia devices 16. A noise mitigation circuit 144, which filters ingress noise from the upstream CATV signals 40, is connected between the low frequency terminals 138 and 140. Together, the low frequency terminals 138 and 140 and the noise mitigation circuit 144 constitute the upstream communication path 114. The removal of ingress noise from the upstream CATV signals 40 helps ensure that those signals 40 are properly received by the CATV network 20.

Under conditions of power loss or abnormal power, the amplifier 142 becomes inoperational and unable to conduct the downstream CATV signals 22 towards to the subscriber device ports 50, 52, 54 and 56. Under such power loss conditions, the inoperational amplifier 142 tends to reflect the downstream CATV signals 22 back to the two-way splitter 108 where the reflected signals adversely affect the downstream CATV signals 22 received by the eMTA device 21. This adverse signal reflection is primarily due to changed impedance characteristics of the amplifier 142 when the amplifier 142 becomes inoperational. The selectable switch 76 functions as a return loss saver by entering the terminated state under abnormal power conditions. Abnormal power conditions are detected by an RLS circuit 146. The RLS circuit is connected between the control circuit and the selectable switch 76. Abnormal power conditions include voltage or current supplied to the amplifier 142 which is above or below expected ranges. In the absence of abnormal power conditions the RLS circuit 146 communicates the activation signal 88, if asserted, to the selectable switch 76. In the presence of abnormal power conditions, the RLS circuit 146 does not communicate the activation signal 88 to the selectable switch 76. When the selectable switch 76 enters the terminated state, the termination resistor 86 is effectively connected to the output leg 110a of the two-way splitter 108. The termination resistor 86 has a resistance which matches the impedance of the coaxial cable 18 (FIG. 1), thus preventing unwanted reflection of the downstream CATV signals 22 to the eMTA device 21 under power loss or abnormal power conditions. More information regarding the RLS circuit 146 can be found in the above mentioned U.S. patent application Ser. No. 12/175,366.

The operation of the CATV entry adapter 10d is essentially the same as that of the CATV entry adapter 10b (FIG. 4), except for the additional active components: the amplifier 142, the noise mitigation circuit 144, and the RLS circuit 146. The CATV entry adapter 10d is suitable for subscribers whose premises could benefit from an amplified downstream CATV signal 22, who wish to use the CATV entry adapter 10d as a hub in an in-home MoCA network, who desire phone service from the CATV service provider and who desire accessibility to emergency phone service even when the CATV service of the subscriber has been terminated.

Figure 7:
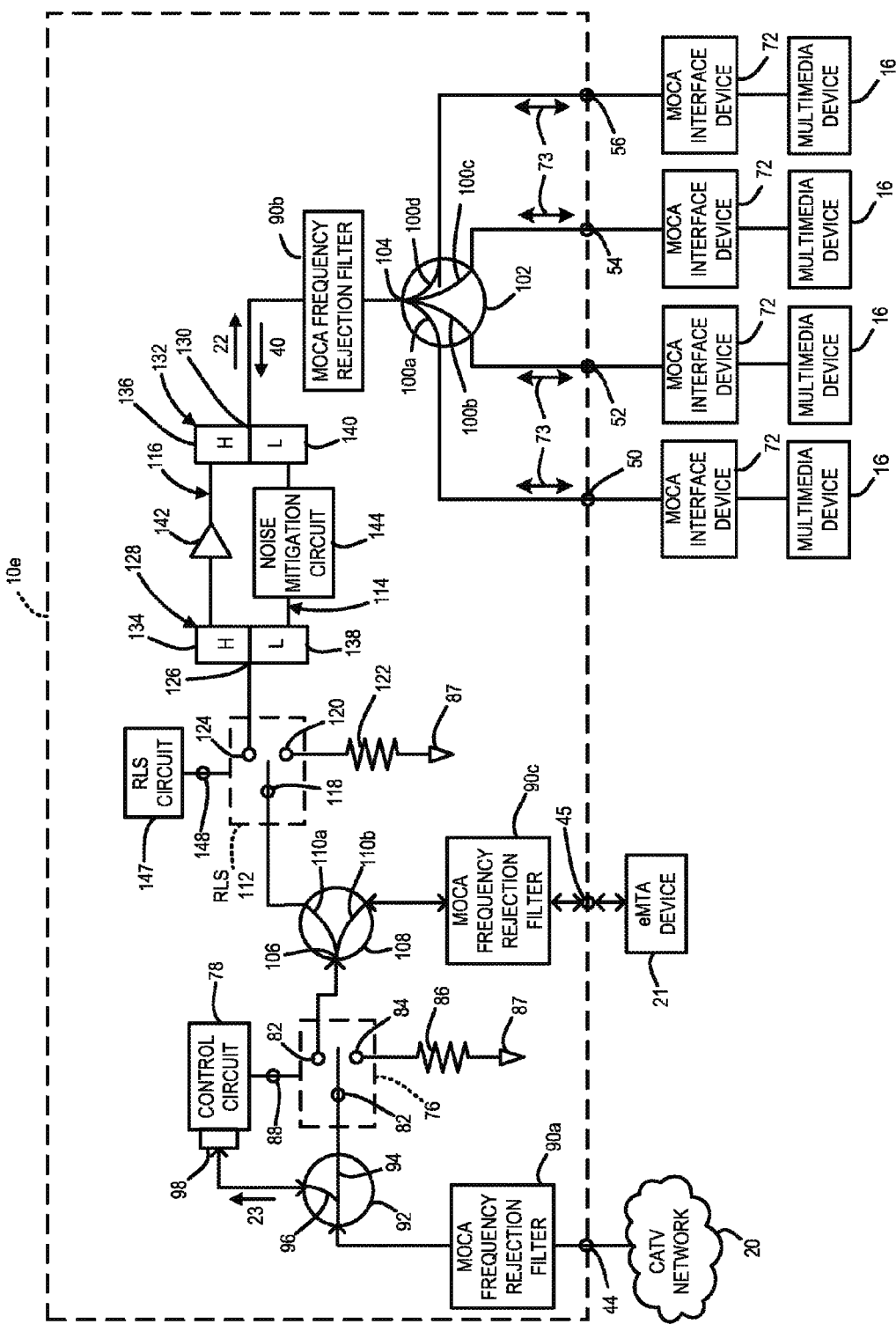
FIG. 7 is a block diagram of functional components of a CATV entry adapter similar to the one shown in FIG. 5, additionally including active electronic components.

The CATV entry adapter 10e shown in FIG. 7 is essentially an active version of the CATV entry adapter 10b (FIG. 4) and is also similar to the adapter 10d (FIG. 6). In addition to those components previously described in relation to the adapter 10b, the CATV entry adapter 10e contains upstream and downstream communication paths 114 and 116, similar to those described above in relation to the adapter 10d (FIG. 6). Additionally, the CATV entry adapter 10e contains a RLS switch 112 which is controlled by an RLS circuit 147. The RLS switch 112 includes an input terminal 118, a termination terminal 120 and a pass-through terminal 124. The input terminal 118 is connected to the terminal leg 110a of the 2-way splitter 108. The termination terminal 120 is connected to a termination resistor 122 which is further connected to the ground 87 of the adapter 10e. The pass-through terminal 124 is connected to the common terminal 126 of the first diplexer 128. Similarly to the selectable switch 76, the RLS switch 112 has two states: a pass-through state and a terminated state. The input terminal 118 is connected to the pass-through terminal 124 when the RLS switch 112 is in the pass-through state. Alternatively, the input terminal 118 is connected to the termination terminal 120 when the RLS switch 112 is in the terminated state.

The RLS circuit 147 detects abnormal power conditions, similarly to the RLS circuit 146 (FIG. 6). Under normal power conditions, the RLS circuit 147 asserts an activation signal 148 to the RLS switch 112 which puts the RLS switch 112 in the pass-through state. Under abnormal power conditions, the RLS circuit 147 deasserts the activation signal 148 to the RLS switch 112 which puts the RLS switch 112 in the terminated state. When the RLS switch 112 is in the terminated state, the termination resistor 122 is effectively connected to the terminal leg 110a of the 2-way splitter 108. As previously described in relation to the selectable switch 76 of the adapter 10d, connecting the terminal leg 110a to the termination resistor 122 prevents undesirable signal reflection from the amplifier 142 to the eMTA device 21 when the amplifier 142 is inoperational.

A difference between the adapters 10e and 10d, is that the selectable switch 76 is upstream of, instead of downstream of, the two-way splitter 108, in adapter 10e. Since CATV communication between the entry port 44 and the eMTA port 45 of the adapter 10e occurs through the selectable switch 76, the eMTA device 21 connected to the eMTA port 45 becomes inoperational when the adapter 10e is disabled.

The CATV entry adapter 10e is suitable for subscribers whose premises could benefit from an amplified downstream CATV signal 22, who desire phone service from the CATV service provider, and who wish to use the CATV entry adapter 10e as a hub in an in-home MoCA network 14.

Figure 8:
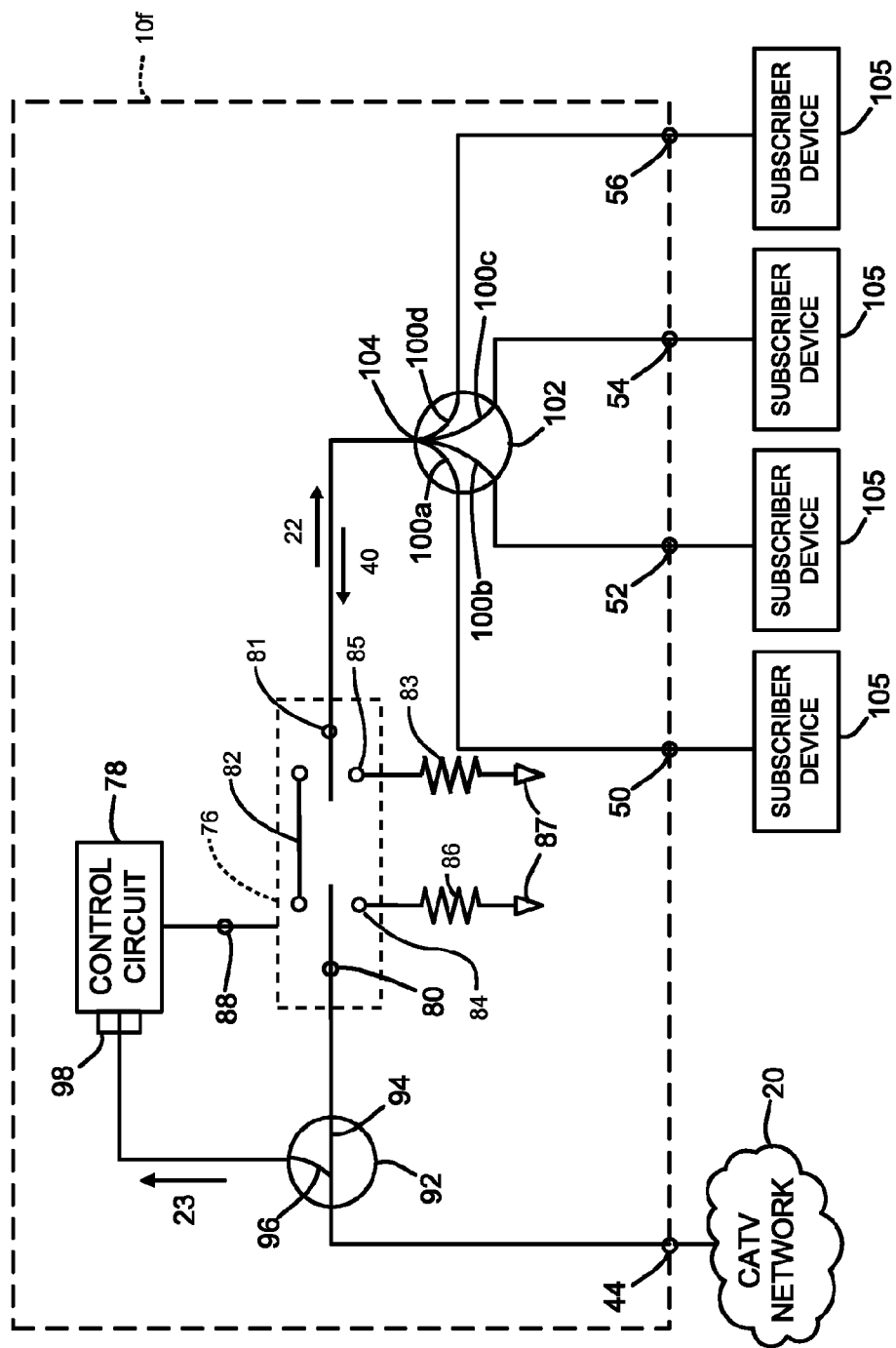
FIG. 8 is a block diagram of functional components of a CATV entry adapter according to another embodiment of the invention, shown connected to the CATV network and to the subscriber device.

The CATV entry adapter 10f shown in FIG. 8 contains a selectable switch 76 which is operated by a control circuit 78. The selectable switch 76 has two input terminals 80 and 81, a pass-through terminal 82 and two termination terminals 84 and 85. The termination terminals 84 and 85 are connected to termination resistors 86 and 83, respectively, which are further connected to a ground 87 of the CATV entry adapter 10f.

The selectable switch 76 has two different states which are selectable by the control circuit 78. In a first, or pass-through state of the selectable switch 76, the input terminals 80 and 81 are connected to the pass-through terminal 82 creating an electrical connection between the input terminals 80, 81 and the pass-through terminal 82. While the selectable switch 76 is in the pass-through state, CATV signals are conducted between the entry port 44 and the subscriber device ports 50, 52, 54 and 56. In a second, or terminated state of the selectable switch 76, the input terminals 80, 81 are connected to the termination terminals 84, 85 respectively. While the selectable switch 76 is in the terminated state, downstream CATV signals from the entry port 44 are conducted to and dissipated by the termination resistor 86 and are therefore not conducted to the subscriber device ports 50, 52, 54 and 56. At the same time, upstream CATV signals and multimedia content or MoCA signals from the common terminal 104 of the four-way splitter 102 are conducted to and dissipated by the termination resistor 83 and are therefore not reflected back to the subscriber device ports 50, 52, 54 and 56.

When the selectable switch 76 is in the pass-through state, the CATV entry adapter 10f and the CATV service to the subscriber are considered enabled. When the selectable switch 76 is in the terminated state, the CATV entry adapter 10f and the CATV service to the subscriber are considered disabled.

The selectable switch 76 does not necessarily have to control the operation of the second input terminal 81. For example, the control circuit 78 may assert or deassert a separate activation signal to a second selectable switch 76b (not shown) which causes the second selectable switch 76b to achieve the requested pass-through or terminated state, if the selectable switch 76b is not already in the requested state. That is, in the pass-through state, the second selectable switch 76b connects the second input terminal 81 to the pass-through terminal 82. In the terminated state, the second selectable switch 76b connects the second input terminal 81 to the second termination terminal 85.

The control circuit 78 is assigned a specific network address which is different from the network addresses assigned to other CATV entry adapters connected to the same CATV network 20. The control circuit 78 is preferably a micro-computer chip, but may also be constructed from other electronic components. The control circuit 78 responds to at least two predetermined command signal packets 23 which are specifically addressed to the control circuit 78. The two predetermined command signal packets 23 cause the control circuit 78 to set the selectable switch 76 into either the pass-through or the terminated state. The CATV service provider can enable or disable the CATV service to a subscriber by sending the appropriate one of the two predetermined command signal packets 23 to the network address associated with the subscriber's CATV entry adapter 10.

When the control circuit 78 receives one of the two predetermined command signal packets 23 addressed to the control circuit 78, the control circuit 78 responds by either asserting or deasserting an activation signal 88 which causes the selectable switch 76 to achieve the requested pass-through or terminated state, if the selectable switch 76 is not already in the requested state. The control circuit 78 maintains the activation signal 88 in the asserted state until the control circuit 78 receives the predetermined disable signal. The control circuit 78 maintains the activation signal 88 in the deasserted state until the control circuit 78 receives the predetermined enable signal. The control circuit 78 and the selectable switch 80 require power to achieve their respective functionality. The selectable switch 80 assumes the terminated state if power to the CATV entry adapter 10f is interrupted.

The predetermined command signal packets 23 reach the control circuit 78 by passing though the entry port 44 and a directional coupler 92. The directional coupler 92 has a through leg 94 and a tap leg 96. The through leg 94 is directly connected to the input terminal 80 of the selectable switch 76. The tap leg 96 is directly connected to an input terminal 98 of the control circuit 78. The directional coupler 92 essentially splits the downstream CATV signals 22 received from the entry port 44 into two copies, one of which is conducted to the tap leg 96 and the other of which is conducted to the through leg 94. The downstream CATV signals 22 conducted to the through leg 94 are not substantially attenuated while the downstream CATV signals 22 conducted through the tap leg 96 are moderately attenuated. Although the downstream CATV signals 22 conducted to the tap leg 96 and the connected input terminal 98 of the control circuit 78 are moderately attenuated, the signals 22 which constitute the predetermined command signal packets 23 are still strong enough to be recognized and interpreted by the control circuit 78. The directional coupler 92 is used to split the downstream CATV signals 22 instead of a conventional two-way splitter because passing the downstream CATV signals 22 through the through leg 94 of the directional coupler 92 results in less signal attenuation than does passing those signals through a two-way splitter.

Each of the subscriber device ports 50, 52, 54 and 56 is connected to one of four terminal legs 100a-100d of a four-way splitter 102. Signals received at a common terminal 104 of the four-way splitter 102 are divided into four identical copies, one of which is conducted to each of the four terminal legs 100a-100d. Likewise, signals received at the terminal legs 100a-100d are combined into a single signal which is conducted through the common terminal 104. Subscriber devices 105 are connected to the subscriber device ports 50, 52, 54 and 56 and receive multimedia content embedded within the downstream CATV signals 22.

The CATV entry adapter 10f is passive and does not include a separate eMTA port 45 (FIGS. 2, 4-7). Downstream CATV signals 22 are conducted directly from the pass-through terminal 82 of the selectable switch 76 to the common terminal 104 of the four-way splitter 102, without any conditioning, amplification or enhancement. Upstream CATV signals 40 are conducted from the subscriber devices 105 connected to the subscriber device ports 50, 52, 54 and 56, through the four-way splitter 102 to the pass-through terminal 82 of the selectable switch 76.

When the CATV entry adapter 10f receives the predetermined command signal packet 23 addressed to the network address corresponding to the control circuit 78 to disable the adapter 10f, the control circuit 78 deasserts the activation signal 88 causing the selectable switch 76 to enter the terminated state and thus disabling the adapter 10f. When the CATV entry adapter 10f is disabled, CATV signal communication between the entry port 44 and the subscriber device ports 50, 52, 54 and 56 does not occur. Likewise, when the CATV entry adapter 10f receives the predetermined command signal packet 23 addressed to the network address corresponding to the control circuit 78 to enable the adapter 10f, the control circuit 78 asserts the activation signal 88 causing the selectable switch 76 to enter the pass through state and thus enabling the adapter 10f. CATV signal communication between the entry port 44 and the subscriber device ports 50, 52, 54 and 56 occurs only when the CATV entry adapter 10f is enabled.

The CATV entry adapter 10f is suitable for subscribers whose premises receive a sufficiently strong downstream CATV signal 22 that does not require further amplification and who do not desire or have access to phone service through the CATV service provider.

The new and improved CATV entry adapters 10a-10f as described above share a number of beneficial features. Each of the CATV entry adapters 10a-10f connects subscriber devices to the CATV network 20 while functioning as a hub in the MoCA network 14 at the subscriber premises 12. Each of the CATV entry adapters 10a-10f may be remotely disabled or enabled through the CATV network 20 by the CATV service provider. Since the CATV entry adapters 10a-10f may be remotely disabled or enabled, the disabling and reenabling of the subscriber's CATV service can be performed remotely which avoids dispatching a CATV technician to physically disconnect or reconnect cables at the subscriber premises. Additionally, the remote disabling or enabling of the CATV entry adapters 10a-10f by the CATV service provider has no detrimental effect on the ability of the CATV entry adapters 10a-10f to function as hubs in MoCA networks 14 at the subscriber premises 21. The embodiment depicted in FIG. 8 is particularly suited for MoCA networks in that when the selectable switch 76 is in the terminated state, upstream CATV signals and multimedia content or MoCA signals are not reflected back to the subscriber device ports 50, 52, 54 and 56. The eMTA capable CATV entry adapters 10b-10f additionally support phone service through the CATV network 20, thus increasing the value of the CATV service supplied to the subscribers. CATV entry adapters 10c and 10d additionally beneficially allow a subscriber to utilize a connected eMTA device for emergency purposes despite the subscriber's CATV service having been terminated. The active CATV entry adapters 10d and 10e additionally contain active components which enhance the quality of the CATV signals 22/44 which pass through the adapters 10d and 10e.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

I claim:

1. A cable television (CATV) entry adapter having an entry port for connection to a CATV network and a plurality of subscriber device ports for connection to subscriber devices, the CATV entry adapter comprising:

a selectable switch having a pass-through state and a terminated state, the selectable switch communicating upstream and downstream CATV signals between the CATV network and the subscriber devices when in the pass-through state, and the selectable switch not communicating upstream and downstream CATV signals between the CATV network and the subscriber devices when in the terminated state, the selectable switch comprising:
a first input terminal;
a pass-through terminal; and
a first termination terminal;
and wherein:
when the selectable switch is in the pass-through state, the upstream and downstream CATV signals between the CATV network and the subscriber devices are communicated through the first input terminal to the pass-through terminal; and
when the selectable switch is in the terminated state, the input terminal is connected to the first termination terminal;

a control circuit connected to control the state of the selectable switch, the control circuit associated with a network address, the control circuit electrically connected to receive the downstream CATV signals including predetermined command signal packets, the control circuit operative to respond to a first predetermined command signal packet addressed to the network address of the control circuit from the CATV network to set the selectable switch into the pass through state, the control circuit operative to respond to a second predetermined command signal packet addressed to the network address of the control circuit from the CATV network to set the selectable switch into the terminated state;

a first splitter having a common terminal and multiple terminal legs, the first splitter connected to receive downstream CATV signals from the selectable switch through the common terminal, each of the multiple terminal legs connected to one of the plurality of subscriber device ports, the first splitter dividing the received downstream CATV signals into multiple copies and sending the multiple copies to the subscriber device ports through the terminal legs, the first splitter adapted to receive upstream CATV signals from each of the plurality of subscriber device ports through the terminal legs and to combine the received upstream CATV signals into a single upstream CATV signal which is supplied to the selectable switch from the common terminal;

a directional coupler having a through leg and a tap leg, the directional coupler electrically connected to pass the upstream and downstream CATV signals between the entry port and the first input terminal of the selectable switch through the through leg, the directional coupler electrically connected to pass the downstream CATV signals including the predetermined command signal packets between the entry port and the control circuit through the tap leg;

an electrical ground;

a first termination resistor electrically connected between the first termination terminal and the electrical ground to dissipate power contained in the downstream CATV signals received by the selectable switch when the selectable switch is in the terminated state; and wherein:

the downstream CATV signals conducted through the through leg are less attenuated than the downstream signals conducted through the tap leg;

an embedded multimedia terminal adapter (eMTA) port adapted for connection to an eMTA device;

a second splitter having a common terminal and first and second terminal legs, the common terminal of the second splitter electrically connected to the pass-through terminal of the selectable switch, the first terminal leg of the second splitter in electrical communication with the common terminal of the first splitter, the second terminal leg of the second splitter in electrical communication with the eMTA port; and wherein:

downstream and upstream CATV signals are not communicated between the entry port and the eMTA port when the selectable switch is in the terminated state; and at least two of the subscriber devices for connection to the subscriber device ports constitute Multimedia-over-Coax Alliance (MoCA)-enabled multimedia devices, the MoCA-enabled multimedia devices communicating with one another in a MoCA network using MoCA signals in a MoCA frequency band through the CATV entry adapter;

a MoCA frequency rejection filter which attenuates MoCA signals, the MoCA frequency rejection filter electrically connected to prevent the communication of MoCA signals between the plurality of subscriber device ports and at least one of the entry port or the eMTA port;

a return loss saver switch having an input terminal, a pass-through terminal and a terminated terminal, the return loss saver switch having a pass-through state in which the input terminal of the return loss saver switch is electrically connected to the pass-through terminal of the return loss saver switch, the return loss saver switch having a terminated state in which the input terminal of the return loss saver switch is electrically connected to the terminated terminal of the return loss saver switch, the input terminal of the return loss saver switch electrically connected to the first terminal leg of the second splitter;

parallel upstream and downstream CATV communication paths electrically connected between the pass-through terminal of the return loss saver switch and the common terminal of the first splitter, the upstream CATV communication path conducting upstream CATV signals from the first splitter to the return loss saver switch, the downstream CATV communication path conducting downstream CATV signals from the return loss saver switch to the first splitter;

at least one active electrical component within the downstream communication path which requires electrical power to operate;

a second termination resistor having a characteristic impedance electrically connected between the terminated terminal of the return loss saver switch and the electrical ground; and a return loss saver circuit which detects abnormal power conditions of the electrical power supplied to the active electronic component including a loss of electrical power, the return loss saver circuit connected to the return loss saver switch and operative to set the return loss saver switch into the terminated state under detected abnormal power conditions; and wherein:

the second termination resistor is in electrical communication with the first terminal leg of the second splitter when the return loss saver is in the terminated state.

2. A CATV entry adapter as defined in claim 1, further comprising:

a second input terminal on the selectable switch electrically connected to the common terminal of the first splitter, the second input terminal electrically connected to the pass-through terminal when the selectable switch is in the pass-through state;

a third termination terminal on the selectable switch electrically connected to the electrical ground, the third termination terminal electrically connected to the second input terminal when the selectable switch is in a terminated state; and a second termination resistor electrically connected between the third termination terminal and the electrical ground to reduce reflections of upstream CATV signals and multimedia content from the subscriber devices.

3. A CATV entry adapter as defined in claim 1, wherein:

the common terminal of the second splitter is in electrical communication with the through terminal of the directional coupler, the first terminal leg of the second splitter is in electrical connection with the input terminal of the selectable switch, the second terminal leg of the second splitter is in electrical communication with the eMTA port and wherein:

downstream and upstream CATV signals are communicated between the entry port and the eMTA port independently of whether the selectable switch is in the passthrough or the terminated state.

4. A CATV entry adapter as defined in claim 3, further comprising:

first and second diplexers each having a common terminal, a high frequency terminal and a low frequency terminal, the common terminal of the first diplexer in electrical communication with the pass-through terminal of the selectable switch, the common terminal of the second diplexer in electrical communication with the common terminal of the first splitter, the high frequency terminals of the first and second diplexers are electrically connected together to define start and end points of the downstream CATV communication path, the low frequency terminals of the first and second diplexers are electrically connected together to define start and end points of the upstream CATV communication path; and a noise mitigation circuit connected between the low frequency terminals of the first and second diplexers to attenuate ingress noise within the upstream CATV signals.

5. A method for selectively and remotely enabling or disabling CATV service at a subscriber premises to allow or prevent a CATV entry adapter from communicating downstream CATV signals from a CATV network to a plurality of subscriber device ports, the subscriber device ports adapted to connect to subscriber devices, the method comprising the steps of:

connecting an entry port of the CATV entry adapter to the CATV network;

connecting at least one subscriber device to one of the subscriber device ports;

communicating the downstream CATV signals from the entry port through a selectable switch to the subscriber device ports in a pass-through state of the selectable switch;

communicating the downstream CATV signals from the entry port through the selectable switch to a first termination resistor instead of the subscriber device ports in a terminated state of the selectable switch;

receiving a first predetermined command signal packet from the CATV network containing a network address associated with the CATV entry adapter that causes the selectable switch to enter the pass-through state;

receiving a second predetermined command signal packet from the CATV network containing a network address associated with the CATV entry adapter that causes the selectable switch to enter the terminated state;

using at least one active electronic component in a downstream communication path between the entry port and the subscriber device ports, wherein the at least one active electronic component is configured to amplify the downstream CATV signals;

supplying power to the CATV entry adapter to power the at least one active electronic component;

recognizing a loss of power to the at least one active electronic component; and communicating the downstream CATV signals through a second termination resistor to an electrical ground in response to recognizing a loss of power to the at least one active electronic component.

6. A method as defined in claim 5, further comprising:

connecting a plurality of Multimedia-over Coax Alliance (MoCA-enabled subscriber devices to the subscriber device ports of the CATV entry adapter;

communicating MoCA signals between the MoCA-enabled subscriber devices through the CATV entry adapter independently of the state of the selectable switch; and preventing the communication of MoCA signals from the subscriber device ports to the entry port.

7. A method as defined in claim 5, further comprising:

receiving the predetermined command signal packets by a control circuit within the CATV entry adapter;

selectively setting the state of the selectable switch by the control circuit in response to receiving the predetermined command signal packets containing the network address associated with the CATV entry adapter;

communicating the downstream CATV signals between the entry port and the plurality of subscriber device ports through a through leg of a directional coupler; and communicating the predetermined command signal packets from the CATV network to the control circuit through a tap leg of the directional coupler.

8. A method as defined in claim 7, further comprising:
connecting an eMTA device to an eMTA port of the CATV entry adapter; and
communicating the downstream CATV signals from the entry port to the eMTA port.

9. A method as defined in claim 8, further comprising:
communicating the downstream CATV signals from the entry port to the eMTA port when the selectable switch is in the pass-through state; and
preventing the communication of the downstream CATV signals from the entry port to the eMTA port when the selectable switch is in the terminated state.

10. A method as defined in claim 8, further comprising:
communicating the downstream CATV signals from the entry port to the eMTA port independently of the state of the selectable switch.

11. A method as defined in claim 10, wherein the step of communicating the downstream CATV signals through a second termination resistor to an electrical ground in response to recognizing a loss of power to the at least one active electronic component comprises the step of:
communicating the downstream CATV signals through a second termination resistor to an electrical ground independently of the state of the selectable switch in response to recognizing a loss of power to the at least one active electronic component.

12. A method as defined in claim 11, further comprising:
recognizing an abnormal power condition of the at least one active electronic component by detecting when voltage or current delivered to the at least one active electronic component is outside of predetermined expected ranges.

13. A method as defined in claim 12, further comprising:
connecting a plurality of Multimedia-over Coax Alliance (MoCA)-enabled subscriber devices to the subscriber device ports of the CATV entry adapter;
communicating MoCA signals between the MoCA-enabled subscriber devices through the CATV entry adapter; and
preventing the communication of MoCA signals from the subscriber device ports to both the entry port and the eMTA port.

14. An electronic device for connection to a cable television (CATV) signal distribution system between a CATV network and a subscriber premises, the electronic device comprising:
a selectable switch having a pass-through state and a terminated state, the selectable switch communicating upstream and downstream CATV signals between the CATV network and the subscriber premises when in the pass-through state, and the selectable switch not communicating upstream and downstream CATV signals between the CATV network and the subscriber premises when in the terminated state;
an entry port, wherein the entry port conducts the upstream and downstream CATV signals between the CATV network and the selectable switch;
a control circuit connected to control the state of the selectable switch, the control circuit associated with a network address, the control circuit electrically connected to receive the downstream CATV signals including predetermined command signal packets, the control circuit operative to respond to a first predetermined command signal packet addressed to the network address of the control circuit from the CATV network to set the selectable switch into the pass through state, the control circuit operative to respond to a second predetermined command signal packet addressed to the network address of the control circuit from the CATV network to set the selectable switch into the terminated state;
a return loss saver switch having an input terminal, a pass-through terminal and a terminated terminal, the return loss saver switch having a pass-through state in which the input terminal of the return loss saver switch is electrically connected to the pass-through terminal of the return loss saver switch, the return loss saver switch having a terminated state in which the input terminal of the return loss saver switch is electrically connected to the terminated terminal of the return loss saver switch, the input terminal of the return loss saver switch electrically connected to the selectable switch;
a return loss saver termination resistor having a characteristic impedance electrically connected between the terminated terminal of the return loss saver switch and an electrical ground; and
a return loss saver circuit which detects abnormal power conditions of the electrical power supplied to an active electronic component of the electronic device, including a loss of electrical power, the return loss saver circuit connected to the return loss saver switch and operative to set the return loss saver switch into the terminated state under detected abnormal power conditions.

15. An electronic device as defined in claim 14, further comprising:
a plurality of subscriber device ports for connection to subscriber devices at the subscriber premises; and
a first splitter having a common terminal and multiple terminal legs, the first splitter connected to receive downstream CATV signals from the selectable switch through the common terminal, each of the multiple terminal legs connected to one of the plurality of subscriber device ports, the first splitter dividing the received downstream CATV signals into multiple copies and sending the multiple copies to the subscriber device ports through the terminal legs, the first splitter adapted to receive upstream CATV signals from each of the plurality of subscriber device ports through the terminal legs and to combine the received upstream CATV signals into a single upstream CATV signal which is supplied to the selectable switch from the common terminal.

16. An electronic device as defined in claim 15, wherein the selectable switch comprises:
a first input terminal;
a pass-through terminal; and
a first termination terminal;
and wherein:
when the selectable switch is in the pass-through state, the upstream and downstream CATV signals between the CATV network and the subscriber devices are communicated through the first input terminal to the pass-through terminal; and
when the selectable switch is in the terminated state, the input terminal is connected to the first termination terminal.

17. An electronic device as defined in claim 16, further comprising:
a directional coupler having an through leg and a tap leg, the directional coupler electrically connected to pass the upstream and downstream CATV signals between the entry port and the first input terminal of the selectable switch through the through leg, the directional coupler electrically connected to pass the downstream CATV signals including the predetermined command signal packets between the entry port and the control circuit through the tap leg; and a first termination resistor electrically connected between the first termination terminal and the electrical ground to dissipate power contained in the downstream CATV signals received by the selectable switch when the selectable switch is in the terminated state; and wherein:

the downstream CATV signals conducted through the through leg are less attenuated than the downstream signals conducted through the tap leg.

18. An electronic device as defined in claim 17, further comprising:

a second input terminal on the selectable switch electrically connected to the common terminal of the first splitter, the second input terminal electrically connected to the pass-through terminal when the selectable switch is in the pass-through state;

a second termination terminal on the selectable switch electrically connected to the electrical ground, the second termination terminal electrically connected to the second input terminal when the selectable switch is in a terminated state; and a second termination resistor electrically connected between the second termination terminal and the electrical ground to reduce reflections of upstream CATV signals and multimedia content from the subscriber devices.

19. An electronic device as defined in claim 17, further comprising:

an embedded multimedia terminal adapter (eMTA) port adapted for connection to an eMTA device;

a second splitter having a common terminal and first and second terminal legs, the common terminal of the second splitter in electrical communication with the through terminal of the directional coupler, the first terminal leg of the second splitter in electrical connection with the input terminal of the selectable switch, the second terminal leg of the second splitter in electrical communication with the eMTA port and wherein:

downstream and upstream CATV signals are communicated between the entry port and the eMTA port independently of whether the selectable switch is in the pass-through or terminated state.

20. An electronic device as defined in claim 19, wherein at least two of the subscriber devices for connection to the subscriber device ports constitute Multimedia-over Coax Alliance (MoCA)-enabled multimedia devices, the MoCA-enabled multimedia devices communicating with one another in a MoCA network using MoCA signals in a MoCA frequency band through the electronic device; the electronic device further comprising:

a MoCA frequency rejection filter which attenuates MoCA signals, the MoCA frequency rejection filter electrically connected to prevent the communication of MoCA signals between the plurality of subscriber device ports and at least one of the entry port or the eMTA port.

21. An electronic device as defined in claim 20, further comprising:

parallel upstream and downstream CATV communication paths electrically connected between the pass-through terminal of the selectable switch and the common terminal of the first splitter, the upstream CATV communication path conducting upstream CATV signals from the first splitter to the selectable switch, the downstream CATV communication path conducting downstream CATV signals from the selectable switch to the first splitter;

at least one active electrical component within the downstream communication path which requires electrical power to operate; and wherein the return loss saver circuit detects abnormal power conditions of the electrical power supplied to the active electronic component including a loss of electrical power, and voltage and current values which are outside of predetermined expected ranges, and wherein the return loss saver circuit is operative to set the selectable switch into the terminated state under detected abnormal power conditions.

22. An electronic device as defined in claim 21, further comprising:

first and second diplexers each having a common terminal, a high frequency terminal and a low frequency terminal, the common terminal of the first diplexer in electrical communication with the pass-through terminal of the selectable switch, the common terminal of the second diplexer in electrical communication with the common terminal of the first splitter, the high frequency terminals of the first and second diplexers are electrically connected together to define start and end points of the downstream CATV communication path, the low frequency terminals of the first and second diplexers are electrically connected together to define start and end points of the upstream CATV communication path; and a noise mitigation circuit connected between the low frequency terminals of the first and second diplexers to attenuate ingress noise within the upstream CATV signals.

23. An electronic device as defined in claim 17, wherein the aforementioned splitter is a first splitter, further comprising:

an embedded multimedia terminal adapter (eMTA) port adapted for connection to an eMTA device; and a second splitter having a common terminal and first and second terminal legs, the common terminal of the second splitter electrically connected to the pass-through terminal of the selectable switch, the first terminal leg of the second splitter in electrical communication with the common terminal of the first splitter, the second terminal leg of the second splitter in electrical communication with the eMTA port; and wherein:

downstream and upstream CATV signals are not communicated between the entry port and the eMTA port when the selectable switch is in the terminated state.

24. An electronic device as defined in claim 23, wherein at least two of the subscriber devices for connection to the subscriber device ports constitute Multimedia-over Coax Alliance (MoCA)-enabled multimedia devices, the MoCA-enabled multimedia devices communicating with one another in a MoCA network using MoCA signals in a MoCA frequency band through the electronic device; the electronic device further comprising:

a MoCA frequency rejection filter which attenuates MoCA signals, the MoCA frequency rejection filter electrically connected to prevent the communication of MoCA signals between the plurality of subscriber device ports and at least one of the entry port or the eMTA port.

25. An electronic device as defined in claim 24, further comprising:

parallel upstream and downstream CATV communication paths electrically connected between the pass-through terminal of the return loss saver switch and the common terminal of the first splitter, the upstream CATV communication path conducting upstream CATV signals from the first splitter to the return loss saver switch, the downstream CATV communication path conducting downstream CATV signals from the return loss saver switch to the first splitter;
and
at least one active electrical component within the downstream communication path which requires electrical power to operate;
and wherein:
   the return loss saver termination resistor is in electrical communication with the first terminal leg of the second splitter when the return loss saver is in the terminated state.

\* \* \* \* \*